(12) United States Patent
Torres Salvador et al.

(10) Patent No.: US 10,458,884 B2
(45) Date of Patent: Oct. 29, 2019

(54) VEHICLE CLOSURE CYCLING DEVICE AND METHOD

(71) Applicant: FORD GLOBAL TECHNOLOGIES, LLC, Dearborn, MI (US)

(72) Inventors: Juan Torres Salvador, Nicolas Romero (MX); Fernando Fragoso H, Ecatepec (MX); Antonio Espiritu Santo Rincon, Atizapan de Zaragoza (MX)

(73) Assignee: Ford Global Technologies, LLC, Dearborn, MI (US)

( * ) Notice: Subject to any disclaimer, the term of this patent is extended or adjusted under 35 U.S.C. 154(b) by 493 days.

(21) Appl. No.: 14/645,504

(22) Filed: Mar. 12, 2015

(65) Prior Publication Data
US 2016/0266013 A1    Sep. 15, 2016

(51) Int. Cl.
*G01M 17/00*    (2006.01)
*G01M 99/00*    (2011.01)

(52) U.S. Cl.
CPC ................ *G01M 99/008* (2013.01)

(58) Field of Classification Search
USPC ............................ 73/116.01, 117.01, 118.01
See application file for complete search history.

(56) References Cited

U.S. PATENT DOCUMENTS

| | | | | |
|---|---|---|---|---|
| 4,342,536 A * | 8/1982 | Akeel | ................ | B05B 13/0292 414/744.4 |
| 4,423,999 A * | 1/1984 | Choly | ................ | B60J 5/00 118/323 |
| 4,458,446 A * | 7/1984 | Mochida | ................ | B60K 28/00 49/28 |
| 4,636,136 A * | 1/1987 | Nomura | ................ | B05B 13/0452 212/166 |
| 5,627,767 A * | 5/1997 | Gabiniewicz | ................ | G01L 5/22 701/102 |
| 5,902,941 A * | 5/1999 | Gabiniewicz | ................ | G01L 19/00 73/865.6 |
| 5,936,167 A * | 8/1999 | Kulig | ................ | G01M 99/008 73/865.6 |
| 7,545,486 B1 * | 6/2009 | Deschutter | ................ | G01P 3/64 356/28 |

(Continued)

FOREIGN PATENT DOCUMENTS

| | | |
|---|---|---|
| CN | 102478450 A | 5/2012 |
| CN | 102564743 A | 7/2012 |

(Continued)

OTHER PUBLICATIONS

English machine translation of CN102478450.
(Continued)

*Primary Examiner* — Eric S McCall
(74) *Attorney, Agent, or Firm* — Jason Rogers; Vichit Chea; King & Schickli, PLLC

(57) ABSTRACT

A vehicle closure cycling device is provided. The device includes a fixture, a first actuator mounted to the fixture and displaceable to open the vehicle closure and a second actuator mounted to the fixture and displaceable to close the vehicle closure at a predetermined closing speed. The device also includes a controller configured to cycle the first actuator and the second actuator in sequence to repeatedly open and close the vehicle closure.

9 Claims, 5 Drawing Sheets

(56) References Cited

U.S. PATENT DOCUMENTS

Figure 2A:
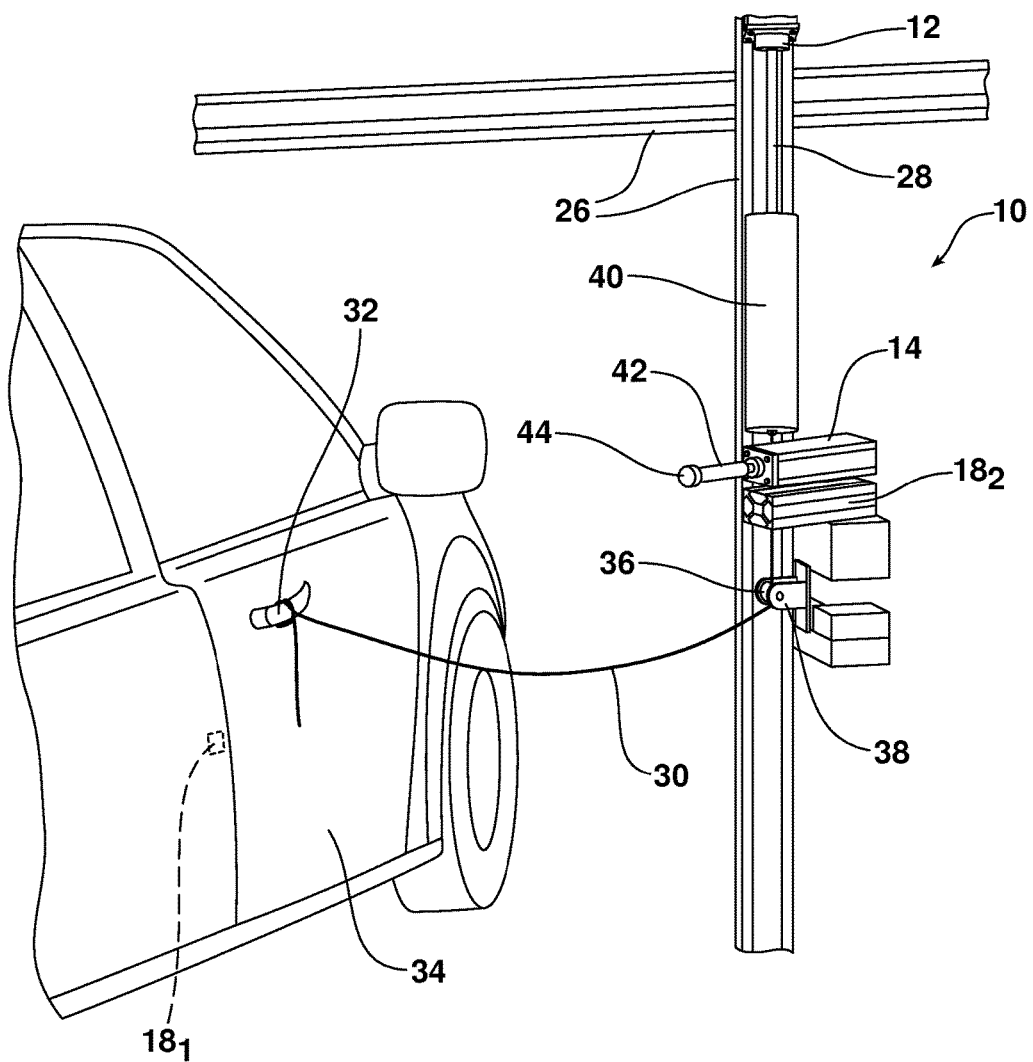

| | | | |
|---|---|---|---|
| 8,571,824 B2 | 10/2013 | Okumura et al. | |
| 2006/0123932 A1* | 6/2006 | Tanaka | G01M 17/007 |
| | | | 73/865.9 |
| 2009/0293614 A1* | 12/2009 | Deschutter | G01P 3/68 |
| | | | 73/510 |
| 2009/0319213 A1* | 12/2009 | Okumura | B62D 65/005 |
| | | | 702/81 |
| 2015/0219511 A1* | 8/2015 | Van Esch | G01M 99/008 |
| | | | 73/865.8 |
| 2016/0168898 A1* | 6/2016 | Makino | E05F 15/646 |
| | | | 49/139 |

FOREIGN PATENT DOCUMENTS

| | | |
|---|---|---|
| CN | 202676438 U | 1/2013 |
| CN | 203011701 U | 6/2013 |
| CN | 103575548 A | 2/2014 |

OTHER PUBLICATIONS

English machine translation of CN102564743.
English machine translation of CN103575548.
English machine translation of CN202676438.
English machine translation of CN203011701.
Gilsbach, Sherrice; "How Ford Uses Robots in Vehicle Testing, Assembly"; Ford Online; https://www.at.ford.com/en/homepage/news-and-clipsheet/news.html; Jan. 7, 2014; pp. 1-3.
"Integrated Life Cycle Fixture"; MGA Research Corporation; http://www.mgaresearch.com/wp-content/uploads/2011/03/June20082.pdf; Paper # 2003-01-1209; Aug. 13, 2010; p. 1 of 1.
Su, Hong; "CAE Virtual Door Slam Test for Plastic Trim Components"; SAE International; https://www.sae.org/publications/technical-papers/content/2003-01-1209/; Mar. 3, 2003; p. 1 of 1.

\* cited by examiner

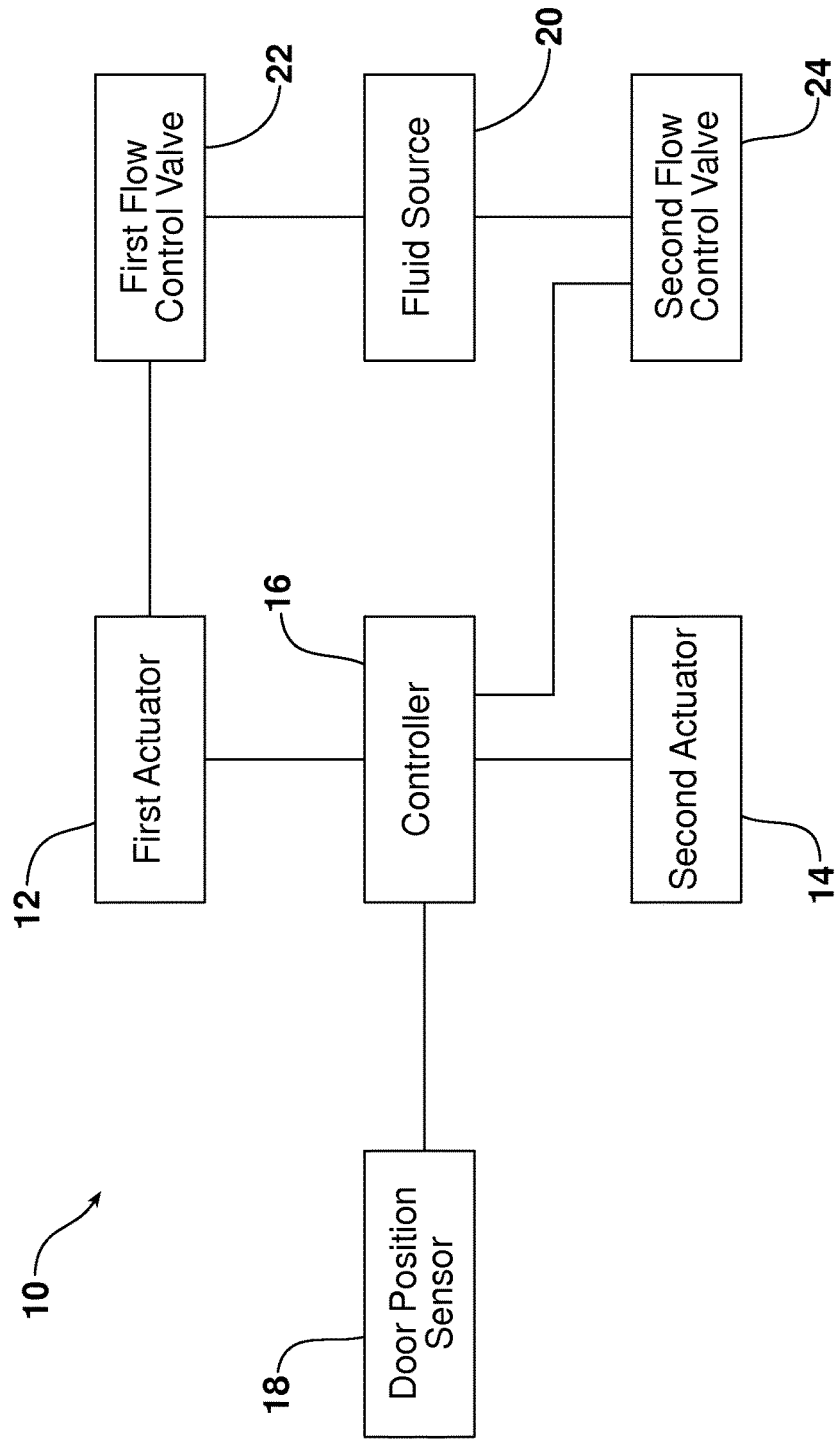

VEHICLE CLOSURE CYCLING DEVICE AND METHOD

TECHNICAL FIELD

This document relates to a vehicle closure cycling device and associated method for testing a vehicle closure such as a door, hood, trunk lid, hatchback lid or tailgate of a motor vehicle.

BACKGROUND

Vehicle closures are cycled repeatedly in order to test the useful life of vehicle components such as handles, latch mechanisms and hinges as well as the service life of interior door trim pieces, power window mechanisms and the like. Automotive door KLT testing requires a device that submits the component or door through an extended opening and closing cycle test. This test requires the door to be opened using the handle, swung open to a predetermined open position and then closed at a regulated speed. Testing is completed in various simulated weather conditions ranging from −40° C. to 82° C. Deploying human resources for this task is not efficient in terms of time, cost and human health.

This document relates to a new and improved vehicle closure cycling device capable of providing for the necessary cycling of the vehicle closure to meet these testing requirements.

SUMMARY

In accordance with the purposes and benefits described herein, a vehicle closure cycling device is provided. That cycling device comprises a fixture, a first actuator mounted to the fixture and a second actuator mounted the fixture. The first actuator is displaceable to open a vehicle closure. The second actuator is displaceable to close the vehicle closure at a predetermined and desired closing speed.

The vehicle closure cycling device may further include a controller, in the form of a computing device, configured to cycle the first actuator and the second actuator in a sequence adapted to repeatedly open and close the vehicle closure.

In one possible embodiment, the device further includes a sensor for monitoring a position of the vehicle closure and providing an indication to the controller when the vehicle closure is in an open position and a closed position. In one possible embodiment, the device further includes a fluid source and a flow control valve. The flow control valve is responsive to the controller whereby fluid pressure to the second actuator is adjusted as necessary in order to close the vehicle closure at the predetermined and desired closing speed for testing purposes.

Still further, the device may include a control line connecting the first actuator to a latch handle of the vehicle closure. In one possible embodiment, the first actuator is a linear actuator. In one possible embodiment, the second actuator is a linear actuator. In one possible embodiment, the device further includes a resilient bumper on the second actuator for engaging the vehicle closure. In one possible embodiment, the first actuator is a pneumatic cylinder. In one possible embodiment, the second actuator is a pneumatic cylinder. Further, in yet another possible embodiment, a metallic sleeve is provided covering the first actuator.

In accordance with an additional aspect, a method is provided for cycling a vehicle closure between an open position and a closed position. That method may be broadly described as comprising the steps of: (a) displacing a first actuator, by means of a controller, from a home position to open the vehicle closure, (b) monitoring a position of the vehicle closure, by means of a sensor, to confirm the vehicle closure is in an open position, (c) returning the first actuator, by means of a controller, to the home position, (d) extending a second actuator, by means of the controller, to close the vehicle closure and (e) monitoring a position of the vehicle closure, by means of the sensor, to confirm the vehicle closure is in a closed position.

The method may further include repeating steps (a)-(e) for a predetermined number of cycles. Further, the method may include adjusting the closing speed of the vehicle closure to a predetermined closing speed desired for testing. Still further, the method may include aligning the second actuator with a closing angle of the vehicle closure. Advantageously, this allows the use of a linear actuator for this purpose thereby eliminating swing arms and other complicated structures.

In the following description, there are shown and described several preferred embodiments of the vehicle closure cycling device and its related method. As it should be realized, the cycling device and method are capable of other, different embodiments and their several details are capable of modification in various, obvious aspects all without departing from the cycling device and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the vehicle closure cycling device and together with the description serve to explain certain principles thereof. In the drawing figures:

FIG. 1 is a schematic block diagram of the vehicle closure cycling device.

Figure 2B:
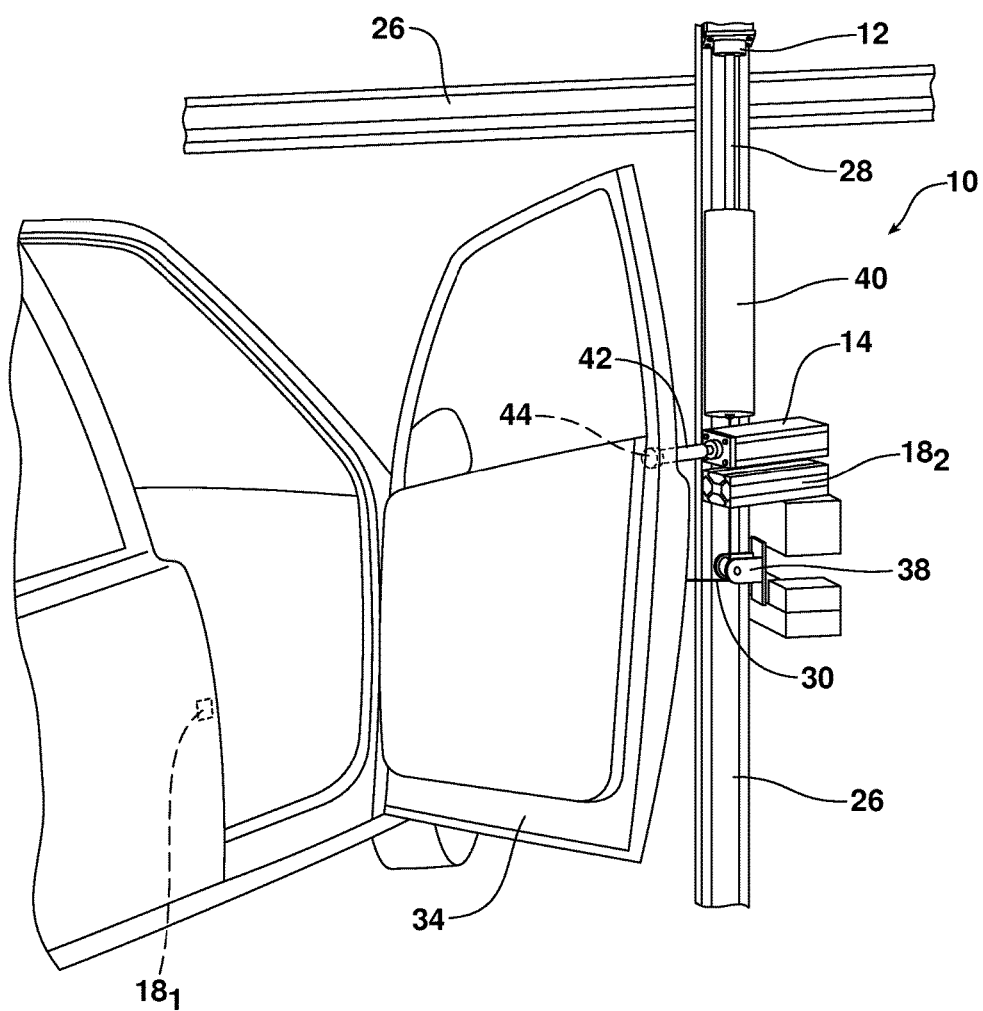
Figure 2C:
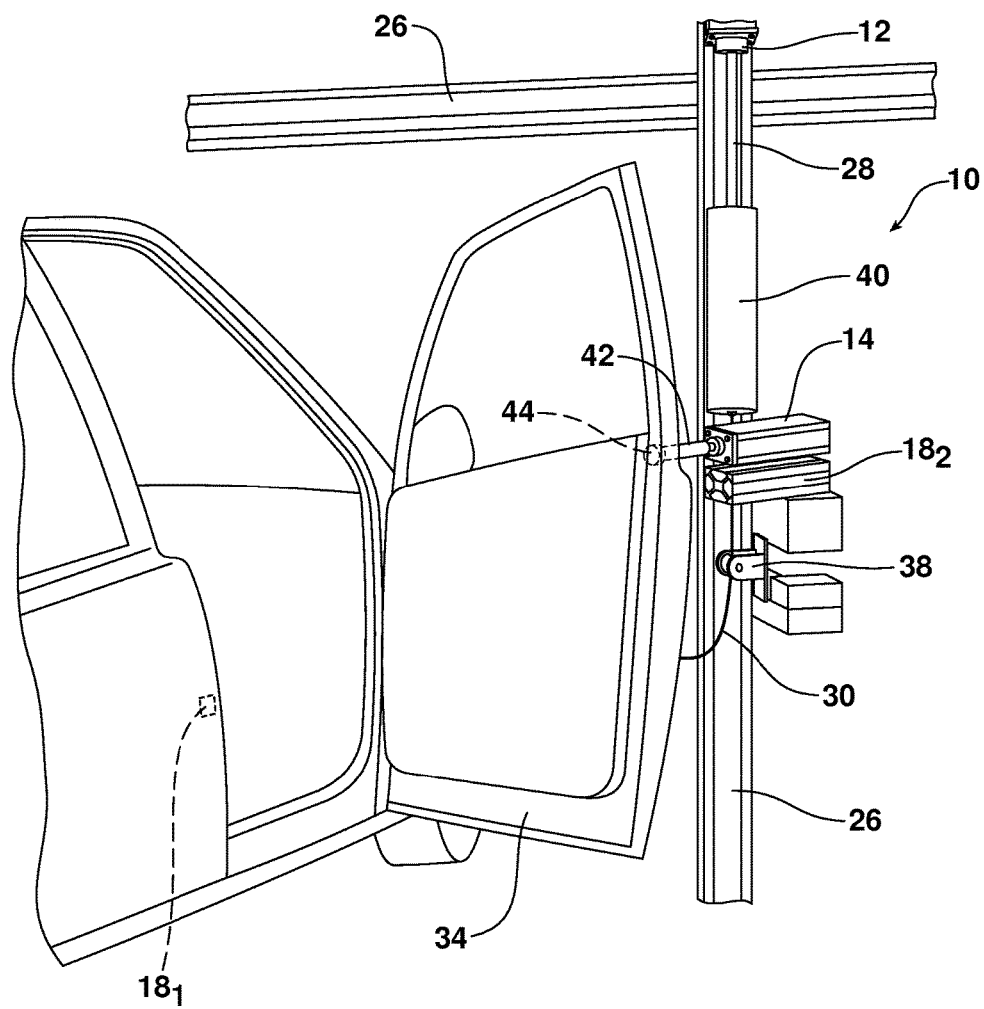
Figure 2D:
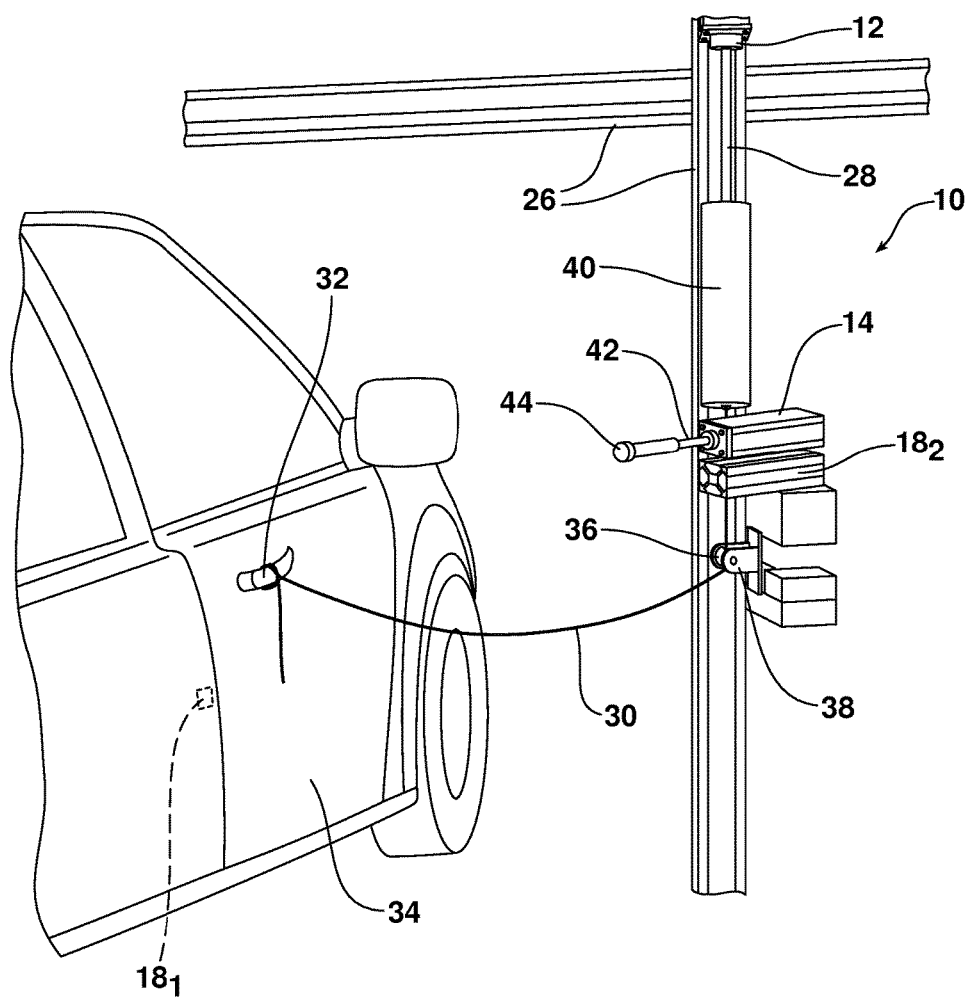

FIGS. 2a-2d are perspective illustrations of a single cycle of the vehicle closure cycling device wherein FIG. 2a illustrates a start position with both actuators in the home position and the vehicle door closed. FIG. 2b illustrates the vehicle door open and the first actuator displaced to the door opening position. FIG. 2c illustrates the vehicle door open and the first actuator recycled to the home position. FIG. 2d illustrates the door closed with the second actuator displaced to the door closing position.

Reference will now be made in detail to the present preferred embodiments of the vehicle closure cycling device, examples of which are illustrated in the accompanying drawing figures.

DETAILED DESCRIPTION

Reference is now made to FIG. 1, which is a schematic illustration of the vehicle closure cycling device 10 that is the subject matter of this document. That vehicle closure cycling device 10 may be broadly described as comprising a first actuator 12 that is displaceable to open a vehicle closure 34, a second actuator 14 that is displaceable to close the vehicle closure and a controller 16 controlling the operation and cycling of the first and second actuators. Controller 16 comprises a computing device such as a dedicated microprocessor or electronic control unit (ECU). Such a computing device may have one or more processors, one or more memories, one or more network interfaces, a human interface and a display device such as a multifunction display with touchscreen capability which all communicate with each other over a communication bus. In one particularly useful embodiment, controller 16 is configured to cycle the first actuator 12 and second actuator 14 in sequence to repeatedly open and close a vehicle closure 34 to be tested.

As further illustrated in FIG. 1, the vehicle closure cycling device 10 includes a door position sensor 18 for monitoring the position of the vehicle closure 34 and providing an indication to the controller 16 when the vehicle closure is in a predetermined and set open position and a closed position. Sensors 18 appropriate for use in the vehicle closure cycling device 10 include, but are not necessarily limited to inductive sensors, capacitive sensors, limit switches, laser sensors, infrared sensors, position (LVDT) sensors, angle sensors, artificial vision (camera) systems and the like.

As further illustrated in FIG. 1, the vehicle closure cycling device 10 includes a fluid source 20, such as an air compressor, for supplying pressurized fluid at a desired pressure to the first and second actuators 12, 14. More specifically, the fluid source 20 provides pressurized fluid to the first actuator through the first flow control valve 22 and to the second actuator 14 through the second flow control valve 24. As will be described in greater detail below, the controller 16 is also configured to control operation of the second flow control valve 24. More specifically, the controller adjusts air flow and pressure provided to the second actuator 14 through the second flow control valve 24 in order to ensure that the vehicle closure is closed at a predetermined closing speed desired for testing.

Reference is now made to FIG. 2a which illustrates some additional aspects of the vehicle closure cycling device 10. As illustrated, the first actuator 12 and second actuator 14 are carried on/mounted to a stationary fixture 26. In the illustrated embodiment, the first actuator 12 is a linear actuator in the form of a pneumatic cylinder including a piston 28. As illustrated, the end of the piston 28 is connected by control line 30 to the latch handle 32 of the vehicle closure 34 to be tested. The control line 30 may comprise a flexible cable that is fastened to the latch handle 32 by any appropriate means.

As further illustrated in FIG. 2a, the first actuator 12 may be mounted in a vertical orientation with the control line 30 passing over a concave pulley 36. A keeper 38 maintains the control line 30 on the pulley 36. In an alternative embodiment, the first actuator 12 is oriented in a horizontal direction or at any angle in between vertical and horizontal so long as the pulley 36 is provided at an appropriate angle between the actuator 12 and the latch handle 32 to provide for smooth operation. A sleeve 40 covers the moving component or piston 28 of the actuator 12. This is to prevent the technician from inadvertently contacting the piston 28 during operation of the actuator.

As further illustrated in FIG. 2a, the second actuator 14 is also mounted on the stationary fixture 26. The second actuator 14 may also be a linear actuator such as a pneumatic cylinder. As illustrated, the second actuator is aligned with a closing angle of the vehicle closure 34 this is to allow for the most efficient and effective operation when utilized to close the closure. As illustrated, the piston 42 of the second actuator 14 includes a resilient bumper 44 on the distal end so as to function as a stop when the closure 34 is opened and to prevent damage to the closure when the second actuator 14 is activated to close the closure. More specifically, the bumper 44 may comprise a hemisphere, cube or prism of soft material such as sponge, plastic, high energy foam or the like.

As further illustrated in FIG. 2a, the door position sensor 18 in the illustrated embodiment comprises two separate sensor devices $18_1$, $18_2$. Sensor device $18_1$ monitors the position of the closure 34 and sends a signal to the controller 16 when the closure is in the closed position. In contrast, sensor device $18_2$ which is schematically illustrated in FIG. 2a, monitors the position of the closure 34 and sends a signal to the controller 16 when the closure is detected in the open position. In the illustrated embodiment, the open position is predetermined to be when the closure 34 is fully open and received in the first detent/holding point of the door mechanism.

Reference is now made to FIGS. 2a-2d which provide serial perspective views illustrating an operating cycle of the closure cycling device 10. FIG. 2a illustrates the cycling device 10 in the start position with the vehicle closure 34 closed and the first and second actuators 12, 14 in their home positions. More specifically, the piston 28 of the first actuator 12 is fully extended and the piston 42 of the second actuator 14 is fully retracted. As illustrated in FIG. 2b, the piston 28 of the first actuator 12 is then displaced, by means of the operation of the controller 16, from the home position illustrated in FIG. 2a to the displaced or retracted position illustrated in FIG. 2b. When this is done, the slack in the control line 30 is taken up and the latch handle 32 is pulled to unlatch the vehicle closure 34 and pull the closure open to the desired or predetermined open position wherein the closure abuts and stops against the resilient bumper 44 on the end of the piston 42 of the second actuator 14 (see FIG. 2b). Next, the sensor $18_1$ provides a signal to the controller 16 indicating when the closure 34 is in the open position. In response to this signal, the controller 16 activates the first actuator 12 causing the piston 28 to be returned to the home, extended position (see FIG. 2c). Once that has occurred, the controller 16 activates the second actuator 14 causing the piston 40 to be extended with a desired force and speed to close the closure 34 at the desired, predetermined closing speed for testing purposes (see FIG. 2d). As previously indicated, that speed may be adjusted by the controller 16 through its control of the second flow control valve 24. The sensor $18_2$ provides an indication to the controller 16 when the closure 34 is in the fully closed position. In response to that signal, the controller 16 then sends a control signal to the second actuator 14 returning the piston 44 to its home or retracted position as illustrated in FIG. 2a. This completes one operating cycle of the vehicle closure cycling device 10. This cycle is repeated for a predetermined number of cycles depending upon the testing criteria that is required.

While not illustrated, it should be appreciated that the vehicle closure cycling device 10 may be installed in an environmental test chamber allowing temperature and other environmental control such as humidity and precipitation. This effectively allows cycle testing under substantially any foreseeable operating conditions. Of course, it should be appreciated that those conditions may also be changed or cycled as desired, consistent with testing parameters to be implemented for testing of a closure.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A vehicle closure cycling device, comprising:
   a stationary fixture;
   a control line extending between a latch handle of a vehicle closure and a pulley;
   a first actuator mounted on said fixture in a vertical orientation with the control line passing over the pulley, said first actuator displaceable to open the vehicle closure;
   a second actuator mounted on said fixture and displaceable to close the vehicle closure at a predetermined closing speed;
   a controller configured to cycle said first actuator and said second actuator in sequence to repeatedly open and close the vehicle closure; and
   a fluid source providing fluid pressure to the first actuator through a first flow control valve and said fluid source providing fluid pressure to the second actuator through a second flow control valve, said second control valve responsive to said controller whereby fluid pressure to said second actuator is adjusted as necessary in order to close the vehicle closure at said predetermined closing speed.

2. The device of claim 1, further including a sensor for monitoring a position of the vehicle closure and providing an indication to said controller when the vehicle closure is in an open position and a closed position.

3. The device of claim 1, wherein the control line connects said first actuator to the latch handle of the vehicle closure.

4. The device of claim 3, wherein said first actuator is a linear actuator.

5. The device of claim 4, wherein said second actuator is a linear actuator.

6. The device of claim 5, further including a resilient bumper on the second actuator for engaging the vehicle closure.

7. The device of claim 1, wherein said first actuator is a pneumatic cylinder.

8. The device of claim 7, wherein said second actuator is a pneumatic cylinder.

9. The device of claim 8, further including a metallic sleeve covering said first actuator.

* * * * *